(12) United States Patent
Adams, III

(10) Patent No.: US 10,758,435 B2
(45) Date of Patent: Sep. 1, 2020

(54) WHEELCHAIR FRAME ASSEMBLY

(71) Applicant: Jerry Lee Adams, III, Dubuque, IA (US)

(72) Inventor: Jerry Lee Adams, III, Dubuque, IA (US)

(*) Notice: Subject to any disclaimer, the term of this patent is extended or adjusted under 35 U.S.C. 154(b) by 222 days.

(21) Appl. No.: 16/119,659

(22) Filed: Aug. 31, 2018

(65) Prior Publication Data

US 2019/0254893 A1 Aug. 22, 2019

Related U.S. Application Data

(60) Provisional application No. 62/632,587, filed on Feb. 20, 2018.

(51) Int. Cl.
| | | |
|---|---|---|
| *A61G 5/04* | (2013.01) | |
| *A61G 5/10* | (2006.01) | |
| *A61G 5/12* | (2006.01) | |
| *B62K 11/00* | (2006.01) | |

(52) U.S. Cl.
CPC .............. *A61G 5/047* (2013.01); *A61G 5/045* (2013.01); *A61G 5/10* (2013.01); *A61G 5/1051* (2016.11); *A61G 5/1059* (2013.01); *A61G 5/1083* (2016.11); *A61G 5/1089* (2016.11); *A61G 5/1091* (2016.11); *A61G 5/128* (2016.11); *B62K 11/007* (2016.11)

(58) Field of Classification Search
CPC ................................ A61G 5/027; A61G 5/025
See application file for complete search history.

(56) References Cited

U.S. PATENT DOCUMENTS

| | | | |
|---|---|---|---|
| 3,807,520 A | 4/1974 | Chisholm | |
| 4,119,163 A | 10/1978 | Ball | |
| 5,044,647 A | 9/1991 | Patterson | |
| 8,738,278 B2 | 5/2014 | Chen | |
| 9,403,573 B1 * | 8/2016 | Mazzei | B62D 51/02 |
| 9,688,340 B1 * | 6/2017 | Kroymann | B62K 21/12 |
| 9,789,924 B2 | 10/2017 | Kroymann et al. | |
| 10,246,158 B2 * | 4/2019 | Kroymann | B62K 23/06 |

(Continued)

FOREIGN PATENT DOCUMENTS

| | | | | |
|---|---|---|---|---|
| CN | 209833773 U | * | 12/2019 | ........... B62K 11/007 |
| WO | WO-2019017823 A1 | * | 1/2019 | ............... B62K 1/00 |
| WO | WO-2020008018 A1 | * | 1/2020 | ........... B62K 11/007 |

*Primary Examiner* — Kevin Hurley
(74) *Attorney, Agent, or Firm* — Boudwin Intellectual Property; Daniel Boudwin

(57) ABSTRACT

A wheelchair frame assembly for a self-balancing board. The wheelchair frame assembly is mountable to the self-balancing board. The self-balancing board includes at least one gyroscopic assembly and includes two wheels on opposing ends of an axle, controlled by two upper surfaces that independently pivot about the axle. Independent pivoting of each of the two upper surfaces controls a speed of an adjacent wheel, and a direction of the self-balancing board. The wheelchair frame assembly includes a seat, a footrest, a forward caster wheel, a rearward caster wheel, a left handlebar, and a right handlebar. The handlebars interface with the two upper surfaces to enable an individual seated in the wheelchair frame assembly to control speed and direction of the self-balancing board by moving the handlebars, thereby pivoting the two upper surfaces and causing the two wheels to independently rotate.

10 Claims, 6 Drawing Sheets

(56) References Cited

U.S. PATENT DOCUMENTS

| | | | |
|---|---|---|---|
| 2013/0062857 A1* | 3/2013 | Winter, V | A61G 5/101 280/246 |
| 2015/0353158 A1* | 12/2015 | Chang | B62K 3/002 180/6.5 |
| 2020/0085650 A1* | 3/2020 | Provda | A63B 22/0017 |

* cited by examiner

WHEELCHAIR FRAME ASSEMBLY

CROSS REFERENCE TO RELATED APPLICATIONS

This application claims priority under 35 U.S.C. § 119(e) to U.S. Provisional Application No. 62/632,587 filed on Feb. 20, 2018. The above identified patent application is incorporated by reference herein in its entirety to provide continuity of disclosure.

BACKGROUND OF THE INVENTION

The present invention relates to a wheelchair frame assembly for a self-balancing board.

Self-balancing boards are popular with many individuals, but they require a user to stand on the board for use. This requirement prevents many individuals, such as handicapped individuals, from using these devices. Transportation solutions for handicapped individuals could be improved by enabling handicapped individuals to use self-balancing boards.

Therefore, there is a need in the art for a wheelchair frame assembly for a self-balancing board. The present invention addresses this unmet need.

Devices have been disclosed in the art that relate to wheelchair frame assemblies. These include devices that have been patented and published in patent application publications. However, these devices may be unstable, and often are not configured for use with a self-balancing board. In view of the devices disclosed in the art, it is submitted that there is a need in the art for an improvement to existing wheelchair frame assemblies. In view of the present disclosure, it is submitted that the present invention substantially diverges in structural and functional elements from devices in the art, and the present invention substantially fulfills an unmet need in the art.

SUMMARY OF THE INVENTION

In view of the disadvantages inherent in the known types of wheelchair frame assemblies in the art, the present invention provides a wheelchair frame assembly for use with a self-balancing board, wherein the same can be utilized for enabling a handicapped individual to use the self-balancing board for transportation.

It is therefore an object of the present invention to provide a wheelchair frame assembly for a self-balancing board.

In one aspect, the invention provides a wheelchair frame assembly for a self-balancing board. The wheelchair frame assembly includes a forward member having a forward end and a rearward end, a seat post disposed on an upper surface of the rearward end of the forward member, a seat disposed on an upper end of the seat post, a footrest disposed on an upper surface of the forward end of the forward member, a forward caster wheel disposed on a lower surface of the forward end of the forward member, and a rearward member having a forward end and a rearward end. The forward end of the rearward member is disposed on a rearward surface of the rearward end of the forward member, and a rearward caster wheel is disposed on a lower surface of the rearward end of the rearward member. In addition, a lateral member having a left end, a right end, and a middle portion is included, wherein the middle portion is disposed on a lower surface of the seat post. A left steering block is rigidly attached to a lower end of a left handlebar and pivotally attached to the left end of the lateral member, and a right steering block is rigidly attached to a lower end of a right handlebar and pivotally attached to the right end of the lateral member. In this manner, the left handlebar pivots the left steering block, and the right handlebar pivots the right steering block.

In some embodiments, the forward member is telescopic, thereby enabling a user to adjust a length of the forward member. In some embodiments, the rearward member is telescopic, thereby enabling the user to adjust a length of the rearward member. In some embodiments, the seat post is telescopic, thereby enabling the user to adjust a height of the seat. In some embodiments, the wheelchair frame assembly includes a suspension, thereby providing additional comfort to the user when using the wheelchair frame assembly.

In some embodiments, the seat post is perpendicular to the forward member to maximize a weight that can be carried by the wheelchair frame assembly. In some embodiments, the seat post is directly above a center of the self-balancing board upon attachment of the wheelchair frame assembly to the self-balancing board. In this manner, a stability of the wheelchair frame assembly is maximized.

Other objects, features and advantages of the present invention will become apparent from the following detailed description taken in conjunction with the accompanying drawings.

BRIEF DESCRIPTIONS OF THE DRAWINGS

Although the characteristic features of the invention will be particularly pointed out in the claims, the invention itself and manners in which it may be made and used may be better understood after a review of the following description, taken in connection with the accompanying drawings, wherein like numeral annotations are provided throughout.

DETAILED DESCRIPTION OF THE INVENTION

Figure 1:
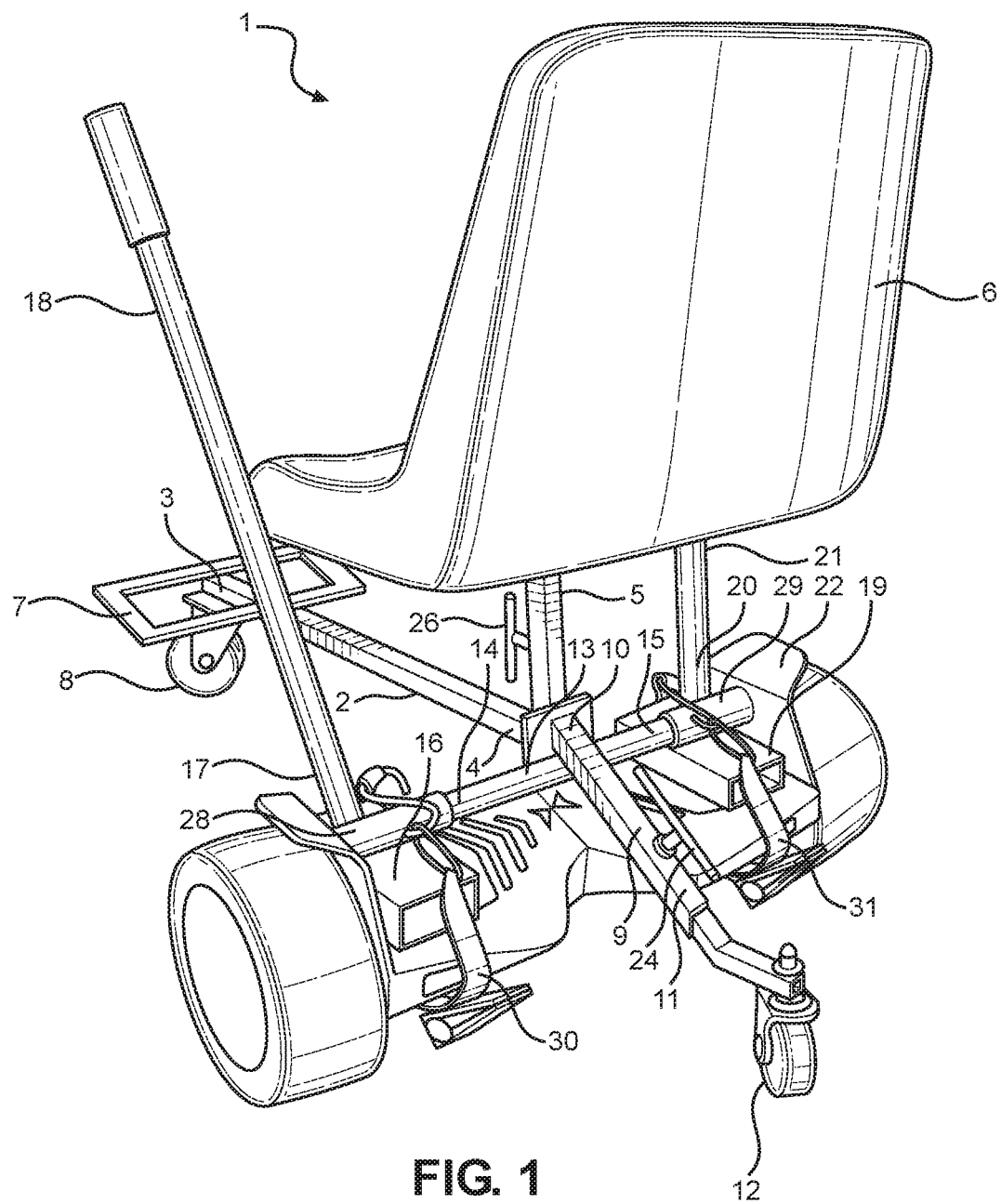
FIG. 1 depicts a side perspective view of an exemplary embodiment of a wheelchair frame assembly for a self-balancing board, mounted on the self-balancing board.

Reference is made herein to the attached drawings. Like reference numerals are used throughout the drawings to depict like or similar elements of the invention. The figures are intended for representative purposes only and should not be considered limiting in any respect.

Reference is now made to the drawings, which depict one or more exemplary embodiments of the invention.

Referring now to FIG. 1, there is depicted a side perspective view of an exemplary embodiment of a wheelchair frame assembly for a self-balancing board, mounted on the self-balancing board. The wheelchair frame assembly 1 includes a forward member 2 having a forward end 3 and a rearward end 4. A seat post 5 is disposed on an upper surface of the rearward end 4 of the forward member 2. In addition, a seat 6 is disposed on an upper end of the seat post 5, thereby enabling a user to sit on the wheelchair frame assembly before, during, or after use.

A footrest 7 is disposed on an upper surface of the forward end 3 of the forward member 2, and a forward caster wheel 8 is disposed on a lower surface of the forward end 3 of the forward member 2, thereby providing comfort and stability to the user and the wheelchair frame assembly, respectively. A rearward member 9 having a forward end 10 and a rearward end 11 is included, such that the forward end 10 of the rearward member 9 is disposed on a rearward surface of the rearward end 4 of the forward member 2. A rearward caster wheel 12 is disposed on a lower surface of the rearward end 11 of the rearward member 9, thereby providing increased stability to the wheelchair frame assembly.

A lateral member 13 having a left end 14, a right end 15, and a middle portion is included, such that the middle portion is disposed on a lower surface of the seat post 5. In addition, a left steering block 16 is rigidly attached to a lower end 17 of a left handlebar 18 and pivotally attached to the left end 14 of the lateral member 13. Similarly, a right steering block 19 is rigidly attached to a lower end 20 of a right handlebar 21, and pivotally attached to the right end 15 of the lateral member 13. In this manner, the left handlebar 18 pivots the left steering block 16, and the right handlebar 20 pivots the right steering block 19. In the shown embodiment, the left steering block 16 is pivotally attached to the left end 14 of the lateral member 13 by a left cylindrical member 28, and the lower end 17 of the left handlebar 18 is rigidly attached to the left cylindrical member 28. In addition, in the shown embodiment, the right steering block 19 is pivotally attached to the right end 15 of the lateral member 13 by a right cylindrical member 29, and the lower end 20 of the right handlebar 21 is rigidly attached to the right cylindrical member 29. In this manner, the left handlebar 18 pivots the left steering block 16 by pivoting the left cylindrical member 28, and the right handlebar 21 pivots the right steering block 19 by pivoting the right cylindrical member 29.

Generally, a movement of the left handlebar 18 is independent of a movement of the right handlebar 21. In this manner, the left steering block 16 and the right steering block 19 each independently pivots about the lateral member 13. An advantage to this design includes a fine-tuned control of a speed and a direction of a self-balancing board 22 during use, as further explained elsewhere herein.

To prepare the wheelchair frame assembly 1 for use, the left steering block 16 and the right steering block 19 are mounted to a left upper surface and a right upper surface of the self-balancing board 22, respectively. Mounting may be performed by any suitable structure, including but not limited to a plurality of straps (30, 31) having buckles, thereby enabling reversible attachment, to allow the wheelchair frame assembly 1 to be used with any of a plurality of different self-balancing boards. The self-balancing board includes at least one gyroscopic assembly and two wheels on opposing ends of an axle, controlled by the two upper surfaces that independently pivot about the axle. Independent pivoting of each of the two upper surfaces controls a speed of an adjacent wheel, and the direction of the self-balancing board 22.

To use the wheelchair frame assembly 1 mounted to the self-balancing board 22, the user activates the self-balancing board 22 and sits on the chair 6. To travel straight forward, the user pushes forward on the left handlebar 18 and the right handlebar 21, thereby pivoting the left steering block 16 and the right steering block 19 in a forward direction about the lateral member 13. This causes the left and right upper surfaces of the self-balancing board 22 to also pivot forward, thereby signaling the left and right wheels of the self-balancing board 22 to rotate in a forward direction. To travel straight rearward, the user pulls rearward on the left handlebar 18 and the right handlebar 21, thereby signaling the left and right wheels of the self-balancing board 22 to rotate in a rearward direction. To turn or rotate left, the right handlebar 21 is pushed forward to a position beyond a position of the left handlebar 18. Similarly, to turn or rotate right, the left handlebar 18 is pushed forward to a position beyond a position of the right handlebar 21, as would be understood by the user.

A feature of the present invention is a placement of the seat post 5 directly above a center of the self-balancing board 22. This design maximizes the stability of the wheelchair frame assembly 1 during use, thereby making the wheelchair frame assembly 1 suitable for use by a handicapped individual. Similarly, to accommodate a potentially limited range of motion of the handicapped individual, the handlebars (18, 21) are angled upward to facilitate grasping of the handlebars (18, 21) during use by the handicapped individual.

Because a center of gravity of the wheelchair frame assembly 1 is directly above the center of the self-balancing board 22, the rearward member 9 having the rearward caster wheel 12 thereon serves to stabilize the wheelchair frame assembly 1 when accelerated in the forward direction, which may cause the handicapped individual using the wheelchair frame assembly 1 to accelerate in the rearward direction. In addition, a length of time during which the self-balancing board 22 is usable may be increased by the caster wheels (8, 12), because less energy is spent balancing by the gyroscopic assembly of the self-balancing board 22.

In the shown embodiment, the seat post 5 is telescopic, and a vertical position of the seat 6 is adjustable by turning a seat post knob 26. In this manner, the wheelchair frame assembly 1 may be fitted for individuals of any of a range of heights, shapes, and sizes.

In the shown embodiment, the wheelchair frame assembly 1 includes a telescopic seat post adjustable by the seat post knob 26, and a telescopic rearward member adjustable by a rearward member knob 24. In this manner, the wheelchair frame assembly 1 may be fitted for individuals of any of a range of heights, shapes, and sizes, and may be disassembled for compact storage or transport.

Figure 2:
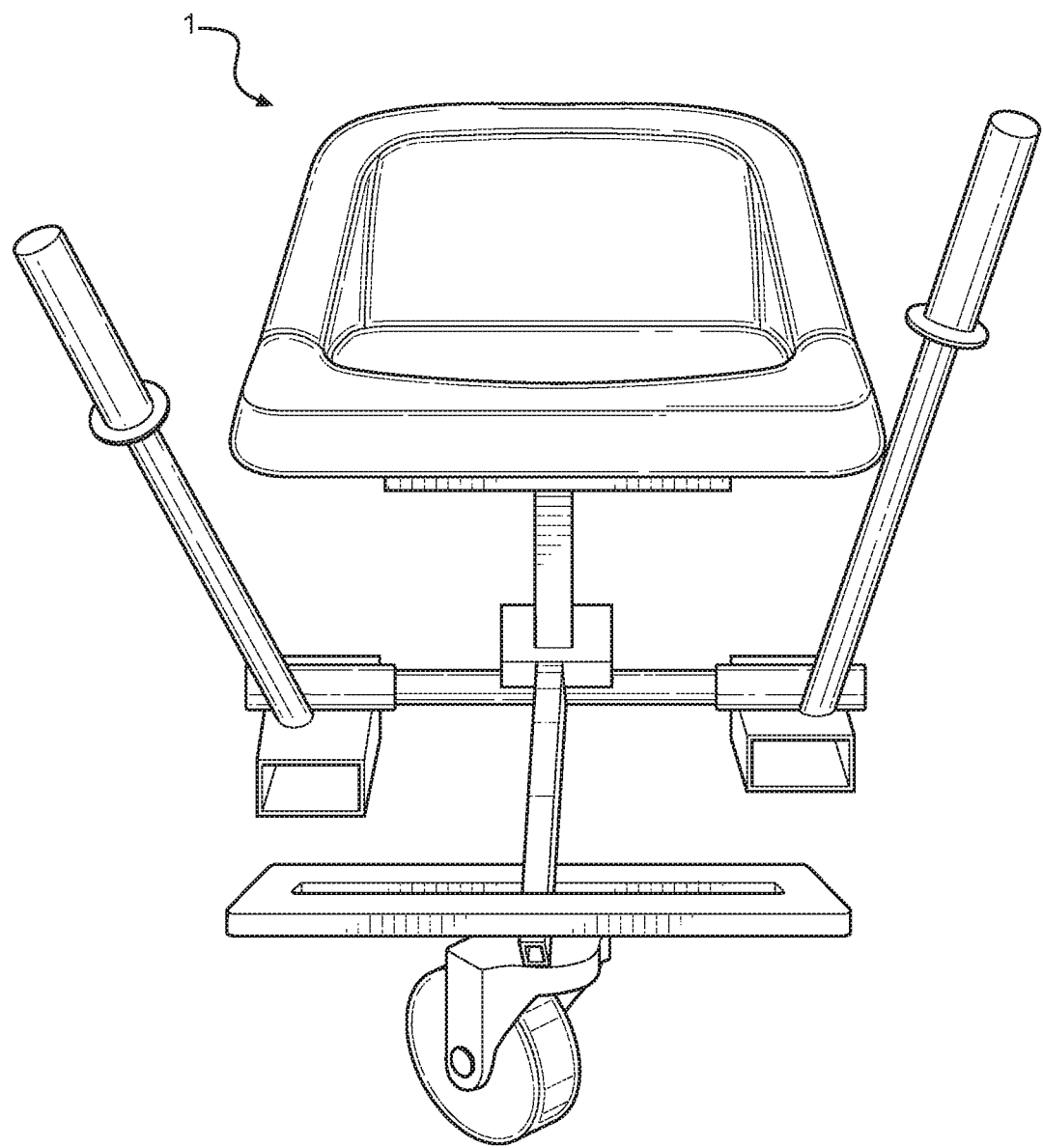
FIG. 2 depicts a front perspective view of the exemplary embodiment of the wheelchair frame assembly for the self-balancing board.

Referring now to FIG. 2, there is depicted a front perspective view of the exemplary embodiment of the wheelchair frame assembly for the self-balancing board. In the shown embodiment, the wheelchair frame assembly 1 does not include any telescopic features.

Figure 3:
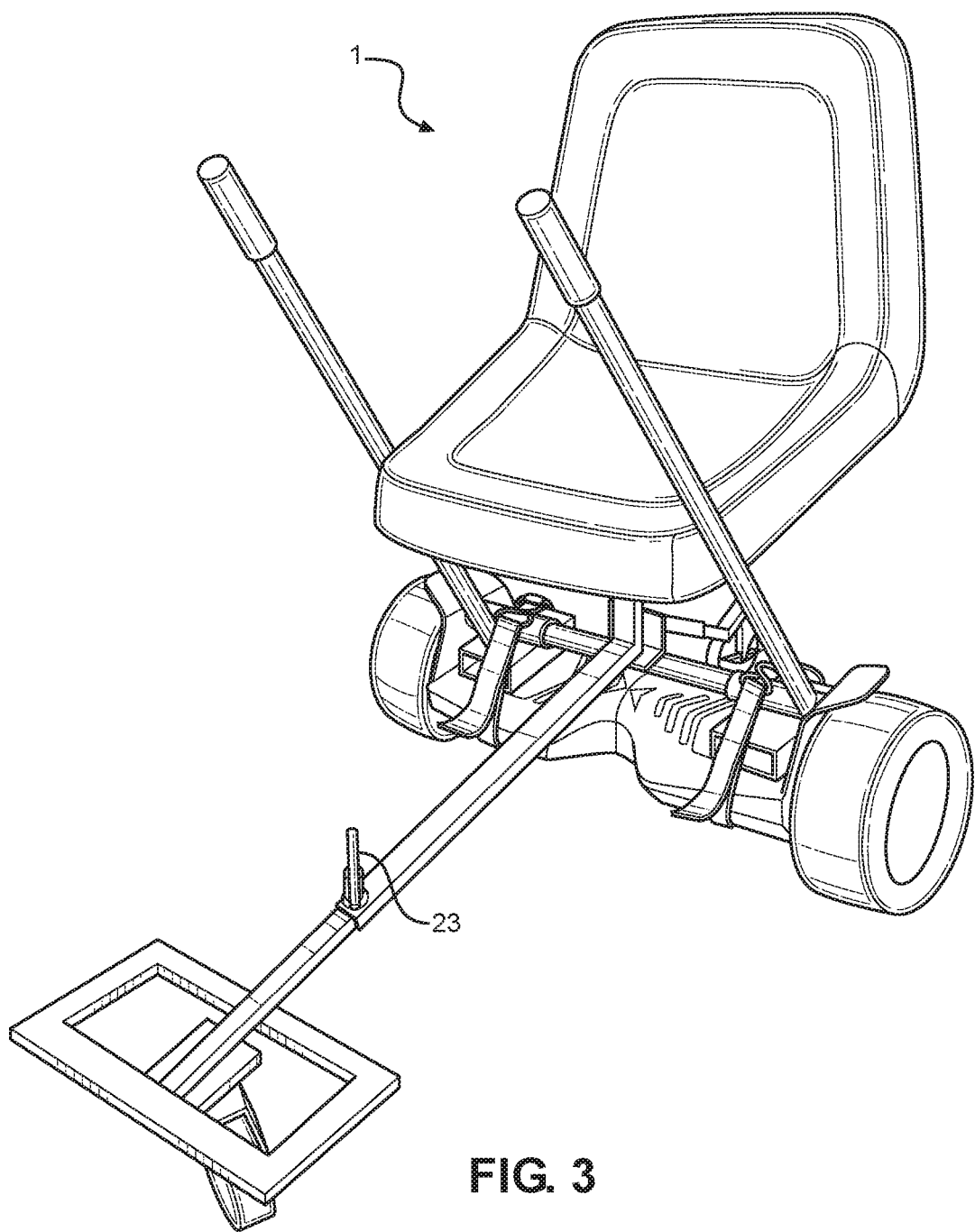
FIG. 3 depicts a side perspective view of the exemplary embodiment of the wheelchair frame assembly for the self-balancing board, mounted on the self-balancing board.

Referring now to FIG. 3, there is depicted a side perspective view of the exemplary embodiment of the wheelchair frame assembly for the self-balancing board, mounted on the self-balancing board. In the shown embodiment, the forward member is telescopic, and a forward position of the footrest is adjustable by turning a forward member knob 23. In this manner, the wheelchair frame assembly 1 may be fitted for individuals of any of a range of heights, shapes, and sizes.

Figure 4:
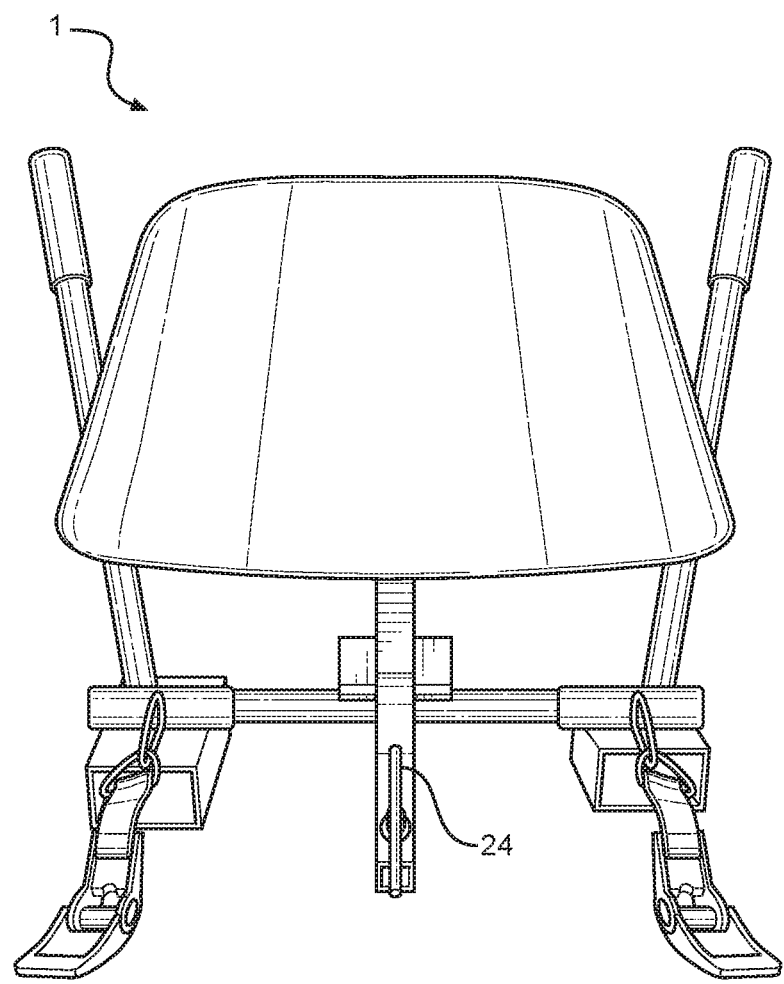
FIG. 4 depicts a rear perspective view of the exemplary embodiment of the wheelchair frame assembly for the self-balancing board.

Referring now to FIG. 4, there is depicted a rear perspective view of the exemplary embodiment of the wheelchair frame assembly for the self-balancing board. In the shown embodiment, the rearward caster wheel has been removed.

The rearward caster wheel may be reattached to the rearward member and secured in place by tightening the rearward member knob 24. Similarly, the rearward member is telescopic, and a rearward position of the rearward caster wheel may be adjusted by loosening and tightening the rearward member knob 24. In this manner, the wheelchair frame assembly 1 may be disassembled for compact storage or transport, and reassembled for use after storage or transport.

Figure 5:
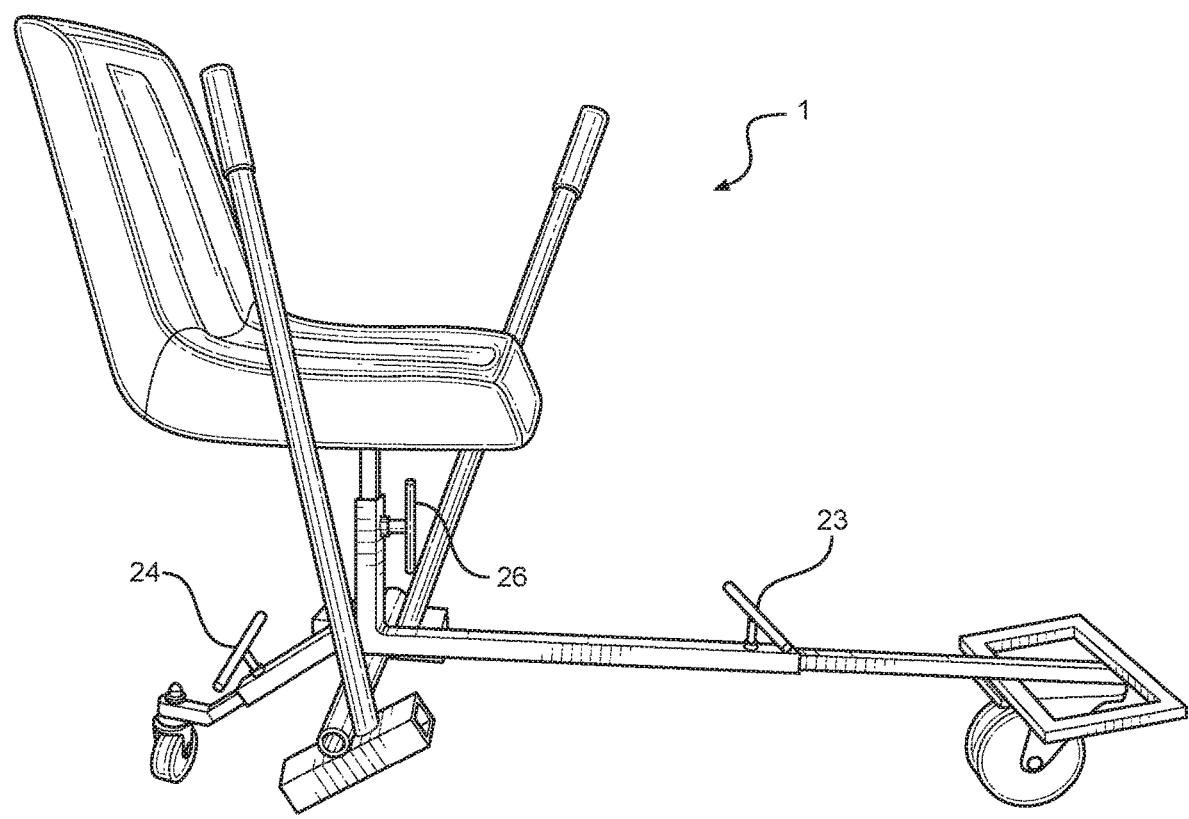
FIG. 5 depicts a side perspective view of the exemplary embodiment of the wheelchair frame assembly for the self-balancing board.

Referring now to FIG. 5, there is depicted a side perspective view of the exemplary embodiment of the wheelchair frame assembly for the self-balancing board. In the shown embodiment, the wheelchair frame assembly 1 includes a telescopic seat post adjustable by the seat post knob 26, a telescopic forward member adjustable by the forward member knob 23, and a telescopic rearward member adjustable by the rearward member knob 24. In this manner, the wheelchair frame assembly 1 may be fitted for individuals of any of a range of heights, shapes, and sizes, and may be disassembled for compact storage or transport.

Figure 6:
FIG. 6 depicts a side perspective view of the exemplary embodiment of the wheelchair frame assembly for the self-balancing board, mounted on the self-balancing board, and in use by a user.

Referring now to FIG. 6, there is depicted a side perspective view of the exemplary embodiment of the wheelchair frame assembly for the self-balancing board, mounted on the self-balancing board, and in use by a user. In the shown embodiment, the wheelchair frame assembly 1 includes an angled forward member 27, and the footrest of the wheelchair frame assembly 1 includes a left footrest bar 25 and a right footrest bar. In this manner, the wheelchair frame assembly 1 effectively accommodates a handicapped individual.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the instant invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

I claim:

1. A wheelchair frame assembly for a self-balancing board, comprising:
    a forward member having a forward end and a rearward end;
    a seat post disposed on an upper surface of the rearward end of the forward member;
    a seat disposed on an upper end of the seat post;
    a footrest disposed on an upper surface of the forward end of the forward member;
    a forward caster wheel disposed on a lower surface of the forward end of the forward member;
    a rearward member having a forward end and a rearward end, wherein the forward end of the rearward member is disposed on a rearward surface of the rearward end of the forward member;
    a rearward caster wheel disposed on a lower surface of the rearward end of the rearward member;
    a lateral member having a left end, a right end, and a middle portion, wherein the middle portion is disposed on a lower surface of the seat post;
    a left steering block rigidly attached to a lower end of a left handlebar and pivotally attached to the left end of the lateral member;
    a right steering block rigidly attached to a lower end of a right handlebar and pivotally attached to the right end of the lateral member;
    wherein the left handlebar pivots the left steering block, wherein the right handlebar pivots the right steering block.

2. The wheelchair frame assembly of claim 1, wherein at least one item selected from a group is telescopic, wherein the group consists of: the forward member, the rearward member, and the seat post.

3. The wheelchair frame assembly of claim 1, wherein the left steering block is pivotally attached to the left end of the lateral member by a left cylindrical member, wherein the lower end of the left handlebar is rigidly attached to the left cylindrical member, wherein the right steering block is pivotally attached to the right end of the lateral member by a right cylindrical member, wherein the lower end of the right handlebar is rigidly attached to the right cylindrical member.

4. The wheelchair frame assembly of claim 1, wherein the wheelchair frame assembly is reversibly attached to the self-balancing board by a plurality of straps.

5. The wheelchair frame assembly of claim 1, wherein the forward member includes an angled portion configured to accommodate a handicapped individual.

6. The wheelchair frame assembly of claim 1, wherein most of a portion of the forward member between the forward end and the rearward end is straight.

7. The wheelchair frame assembly of claim 1, wherein the footrest either includes a left footrest bar and a right footrest bar, or is rectangular.

8. The wheelchair frame assembly of claim 1, wherein the rearward caster wheel is removably disposed on the lower surface of the rearward end of the rearward member.

9. The wheelchair frame assembly of claim 1, wherein the seat post is perpendicular to the forward member.

10. The wheelchair frame assembly of claim 9, wherein the seat post is directly above a center of the self-balancing board upon attachment of the wheelchair frame assembly to the self-balancing board.

\* \* \* \* \*